US009554042B2

(12) United States Patent
Petrescu et al.

(10) Patent No.: US 9,554,042 B2
(45) Date of Patent: Jan. 24, 2017

(54) PREVENTING MOTION ARTIFACTS BY INTELLIGENTLY DISABLING VIDEO STABILIZATION

(71) Applicant: Google Technology Holdings LLC, Mountain View, CA (US)

(72) Inventors: Doina I. Petrescu, Vernon Hills, IL (US); Bill Ryan, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 429 days.

(21) Appl. No.: 13/625,381

(22) Filed: Sep. 24, 2012

(65) Prior Publication Data

US 2014/0085493 A1    Mar. 27, 2014

(51) Int. Cl.
H04N 5/232    (2006.01)

(52) U.S. Cl.
CPC ...... H04N 5/23248 (2013.01); H04N 5/23254 (2013.01); H04N 5/23258 (2013.01)

(58) Field of Classification Search
CPC ... G06T 7/20; H04N 5/23248; H04N 5/23254; H04N 5/23258; H04N 5/23267
USPC ....... 348/208.99–208.13, 349, 345, 352, 350
See application file for complete search history.

(56) References Cited

U.S. PATENT DOCUMENTS

| | | | |
|---|---|---|---|
| 6,222,587 B1 | 4/2001 | Ito et al. | |
| 6,362,852 B2 | 3/2002 | Ito | |
| 6,628,711 B1 | 9/2003 | Mathew et al. | |
| 6,734,901 B1 | 5/2004 | Kudo et al. | |
| 6,734,902 B1 | 5/2004 | Kawahara | |
| 7,609,293 B2 | 10/2009 | Faulkner et al. | |
| 8,150,250 B2 * | 4/2012 | Saito et al. | 396/55 |
| 8,208,746 B2 * | 6/2012 | Albu et al. | 382/255 |
| 8,274,596 B2 | 9/2012 | Pincenti et al. | |

(Continued)

FOREIGN PATENT DOCUMENTS

| | | |
|---|---|---|
| EP | 1998554 A1 | 12/2008 |
| KR | 10-2008-0028764 A | 4/2008 |

OTHER PUBLICATIONS

International Preliminary Report on Patentability, from corresponding application PCT/US2013/057903, dated Apr. 2, 2015, 6 pages.

(Continued)

*Primary Examiner* — Pritham Prabhakher
(74) *Attorney, Agent, or Firm* — Brake Hughes Bellermann LLP

(57) ABSTRACT

Digital video stabilization is selectively turned off in circumstances where it could actually decrease the quality of a captured video. A video camera includes a device for directly detecting physical motion of the camera. Motion data from the motion detector are analyzed to see if video stabilization is appropriate. If the motion data indicate that the video camera is stable, for example, then video stabilization is not applied to the video, thus preventing the possibility of introducing "motion artifacts" into the captured video. In another example, motion as detected by the motion detector can be compared with motion as detected by the video-stabilization engine. If the two motions disagree significantly, then the video-stabilization engine is probably responding more to motion in the captured video rather than to motion of the camera itself, and video stabilization should probably not be applied to the video.

17 Claims, 7 Drawing Sheets

(56) References Cited

U.S. PATENT DOCUMENTS

| | | | |
|---|---|---|---|
| 8,350,916 B2* | 1/2013 | Ohmiya et al. | 348/208.99 |
| 8,351,726 B2* | 1/2013 | Albu et al. | 382/260 |
| 8,400,517 B2* | 3/2013 | Bousquet | H04N 5/23248 |
| | | | 348/208.2 |
| 8,497,914 B2* | 7/2013 | Mistretta | G06T 5/50 |
| | | | 348/158 |
| 8,553,093 B2* | 10/2013 | Wong | G06T 3/4069 |
| | | | 348/208.13 |
| 8,558,903 B2* | 10/2013 | Liu | H04N 5/23248 |
| | | | 348/208.4 |
| 8,558,943 B2* | 10/2013 | Stavely | G03B 17/02 |
| | | | 348/208.12 |
| 8,593,530 B2* | 11/2013 | Watanabe | H04N 5/23219 |
| | | | 348/208.4 |
| 8,624,998 B2* | 1/2014 | James et al. | 348/231.2 |
| 8,648,919 B2* | 2/2014 | Mantzel et al. | 348/208.6 |
| 2003/0108334 A1 | 6/2003 | Nevenka et al. | |
| 2003/0133034 A1 | 7/2003 | Takahashi | |
| 2005/0275742 A1 | 12/2005 | Baron | |
| 2006/0061658 A1* | 3/2006 | Faulkner | H04N 5/23248 |
| | | | 348/207.1 |
| 2006/0066744 A1 | 3/2006 | Stavely et al. | |
| 2006/0120709 A1 | 6/2006 | Kobayashi | |
| 2006/0120710 A1 | 6/2006 | Nagano et al. | |
| 2006/0192886 A1 | 8/2006 | Kobayashi | |
| 2006/0232697 A1 | 10/2006 | Ito et al. | |
| 2007/0013777 A1 | 1/2007 | Inoue et al. | |
| 2007/0076982 A1 | 4/2007 | Petrescu | |
| 2007/0248166 A1 | 10/2007 | Chen et al. | |
| 2008/0031609 A1 | 2/2008 | Rukes | |
| 2008/0037970 A1* | 2/2008 | Saito | G03B 5/00 |
| | | | 396/55 |
| 2008/0074530 A1 | 3/2008 | Okawa et al. | |
| 2008/0309769 A1* | 12/2008 | Albu | H04N 5/144 |
| | | | 348/208.1 |
| 2009/0009612 A1* | 1/2009 | Tico | H04N 1/00307 |
| | | | 348/208.1 |
| 2009/0066800 A1* | 3/2009 | Wei | H04N 5/23254 |
| | | | 348/208.99 |
| 2009/0273704 A1* | 11/2009 | Pincenti | H04N 5/23212 |
| | | | 348/349 |
| 2011/0193978 A1* | 8/2011 | Wu | H04N 5/23248 |
| | | | 348/208.6 |
| 2011/0234822 A1* | 9/2011 | Miyasako | H04N 5/23212 |
| | | | 348/208.1 |
| 2011/0234825 A1* | 9/2011 | Liu | H04N 5/23248 |
| | | | 348/208.5 |
| 2011/0298936 A1* | 12/2011 | Watanabe | H04N 5/23219 |
| | | | 348/208.4 |
| 2012/0069203 A1 | 3/2012 | Voss et al. | |
| 2012/0086822 A1* | 4/2012 | Ishii | H04N 5/23258 |
| | | | 348/208.6 |
| 2012/0154615 A1* | 6/2012 | Noguchi | 348/208.6 |
| 2012/0229385 A1* | 9/2012 | Fu | G06F 3/0346 |
| | | | 345/163 |
| 2013/0021483 A1* | 1/2013 | Bennett et al. | 348/208.4 |
| 2013/0057713 A1* | 3/2013 | Khawand | H04N 5/232 |
| | | | 348/208.1 |
| 2013/0093906 A1* | 4/2013 | Carlsson | H04N 5/23258 |
| | | | 348/208.99 |
| 2013/0155264 A1* | 6/2013 | Zhou | H04N 5/23258 |
| | | | 348/208.6 |
| 2013/0155266 A1* | 6/2013 | Zhou | 348/208.99 |
| 2013/0258129 A1* | 10/2013 | Burns | 348/222.1 |
| 2013/0329062 A1* | 12/2013 | Zhou et al. | 348/208.1 |
| 2013/0329066 A1* | 12/2013 | Zhou | H04N 5/23248 |
| | | | 348/208.99 |
| 2013/0342714 A1* | 12/2013 | Zhou et al. | 348/208.2 |

OTHER PUBLICATIONS

"K. Choi, J. Lee, and S Ko, "New Autofocusing Technique using the Frequency Selective Weighted Median Filter for Video Cameras," IEEETransactions on Consumer Electronics, vol. 45, No. 3, pp. 820-827, Aug. 1999."

"K. Ooi, K. Izumi, M. Nozaki, and I. Takeda, ""An Advanced Autofocus System for Video Camera using Quasi Condition Reasoning,"" IEEETransactions on Consumer Electronics, vol. 36, No. 3, pp. 526-530, Aug. 1990."

"J. He, R. Zhou, and Z. Hong, ""Modified Fast Climbing Search Auto-focus Algorithms with Adaptive Step Size Searching Technique for DigitalCamera,"" IEEE Transactions on Consumer Electronics, vol. 49, No. 2, pp. 257-262, May 2003."

"M. Gamadia, V. Peddigari, N. Kehtarnavaz, S-Y. Lee, and G. Cook, ""Real-time Implementation of Auto Focus on the TI DSC Processor,"" Proceedings of SPIE-IS&T Electronic Imaging (Real-time Imaging VIII), vol. 5297, pp. 10-18."

"N. Kehtarnavaz and H.-J.Oh, ""Development and real-time implementation of a rule-based auto-focus algorithm,"" Real-Time Imaging, vol. 9, pp. 197-203, 2003."

"Transport Research Board, of National Academies ""Transport Cooperative Research Program, Report 86, Intrusion Detection for Public Transportation Handbook"", http://onlinepubs.trb.org/Onlinepubs/tcrp/tcrp_rpt_86v4.pdf, 172 pages."

"Kodak, ""Kodak Easy Share DX7590 Digital Camera Specifications"", http://www.kodak.com/eknec/PageQuerier.jhtml?pq-locale=en_US&pqpath=2798,"."

Patent Cooperation Treaty, "PCT Search Report and Written Opinion of the International Searching Authority" for International Application No. PCT/US2009/040912 dated Dec. 4, 2009, 10 pages.

United States Patent and Trademark Office, "Non-Final Rejection" for U.S. Appl. No. 12/112,196 dated Dec. 21, 2010, 11 pages.

United States Patent and Trademark Office, "Final Rejection" for U.S. Appl. No. 12/112,196 dated Jul. 6, 2011, 10 pages.

United States Patent and Trademark Office, "Final Rejection" for U.S. Appl. No. 12/112,196 dated Jan. 3, 2012, 10 pages.

United States Patent and Trademark Office, "Notice of Allowance and Fee(s) Due" for U.S. Appl. No. 12/112,196 dated Jun. 13, 2012, 9 pages.

Patent Cooperation Treaty, International Search Report and Written Opinion of the International Searching Authority for International Application No. PCT/US2013.956893, Nov. 7, 2013, 8 pages.

* cited by examiner ized video clip, which therefore does not appear to be as "shaky." Note that this all works well as long as the only thing that has moved between frames is the device 100 itself. As discussed below, this is not always the case.

PREVENTING MOTION ARTIFACTS BY INTELLIGENTLY DISABLING VIDEO STABILIZATION

CROSS-REFERENCE TO RELATED APPLICATIONS

The present application is related to U.S. patent application PCT/US13/579,07, filed on an even date herewith.

TECHNICAL FIELD

The present disclosure is related generally to digital-image capture and, more particularly, to digital video stabilization.

BACKGROUND

Digital video-capture devices, such as still and video cameras, are becoming more commonplace. Once available only on high-end professional cameras, today such digital devices are found in smartphones, tablet computers, and other personal electronics devices. Digital cameras are small and relatively inexpensive to manufacture and are thus popular accessories in today's personal electronics devices.

Because these personal electronics devices are often quite small and light, they can be easily shaken when the user is trying to take a photograph or a movie, and this shaking can produce blurry images. To compensate for shaking, digital video stabilization methods compare captured images frame by frame and apply global motion compensation to remove the frame-to-frame motion and to thus make the captured images less blurry.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
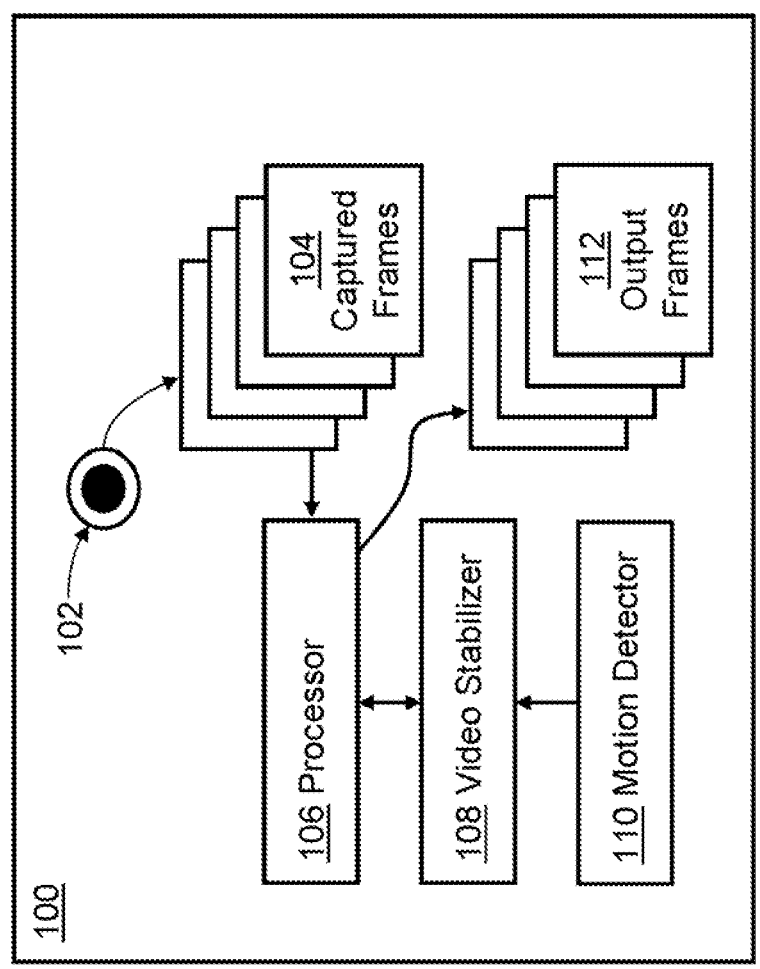
FIG. 1 is an schematic of a representative personal electronics device with a video camera in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Digital video stabilization is selectively turned off in circumstances where it could actually decrease the quality of a captured video. A video camera includes a motion detector device for directly detecting physical motion of the camera (e.g., a gyroscope, accelerometer, a GPS receiver, or another camera). Motion data from the motion detector are analyzed to see if video stabilization is appropriate. If the motion data indicate that the video camera is stable, for example, then video stabilization is not applied to the video, thus preventing the possibility of introducing "motion artifacts" into the captured video. In another example, motion as detected by the motion detector can be compared with motion as detected by the video-stabilization engine. If the two motions disagree significantly, then the video-stabilization engine is probably responding more strongly to motion in the captured images than to motion of the camera itself, and video stabilization should probably not be applied to the video.

Various embodiments can be implemented in hardware or as executable code running on a microprocessor or a controller of an video-capture system. Where so configured, the executable code can include various modules that determine video stability and physical motion.

FIG. 1 shows a representative personal electronics device 100 that can embody aspects of the present disclosure. The device 100 can be just about any device with a video camera 102 including, for example, a dedicated camera, a mobile telephone, a personal digital assistant, or a tablet computer.

The video camera 102 of FIG. 1 represents an entire video-capture device, as known in the art. A typical video-capture device 102 includes an image sensor and a control circuit (represented in FIG. 1 by the processor 106, but see the discussion below). The image sensor, which can be any type of image sensor known in the art, such as a CMOS or a CCD sensor, receives light through a lens. The light is reflected off a subject and is then captured by the image sensor to form an image. The captured image is stored as one digital frame 104. Generally speaking, the video camera 102 creates frames of captured images as a constant rate. When displayed to a user at the same rate, the succession of frames is a video clip. As is known in the art, the video-capture device 102 may include other optical, mechanical, and electronic systems (including a variable aperture, lenses, an auto-focus engine, and the like). The personal electronics device 100 can include another video camera (not shown in FIG. 1), the possible use of which is discussed below.

For ease of discussion, it is assumed that the personal electronics device 100 is completely controlled by a software-driven processor 106. In some embodiments, however, a microcontroller, embedded controller, or application-specific controller 106 controls certain aspects of the device 100 including the video stabilizer 108 (also called a video-stabilization engine) and the motion detector 110 as described below in reference to FIGS. 2, 4, and 5. In some embodiments, control functions are divided among multiple modules within the device 100 including both software-controlled processors and hardwired controllers.

The video-stabilization engine 108, as is well known in the art, reviews the captured frames 104 and attempts to detect motion of the personal electronics device 100. If, for example, a pixel-by-pixel comparison of two successive frames 104 reveals that the second frame is essentially identical to the first but displaced by a small but constant amount to the right, then it is possible that the image being captured has not moved to the right, but instead the device 100 has moved that small distance to the left. This often happens when the hands holding the device 100 shake. Continuing with the above example, in traditional operation, the video-stabilization engine 108 attempts to compensate for this small movement of the device 100 by shifting the image of the second frame back to the left. The motion of the device 100 has been compensated for by moving the image in the succession of captured frames 104, and in the resultant video, which comprises the motion-compensated output frames 112, there are, ideally, no lingering effects of the shaking of the device 100.

(As a side note, in order to shift the captured image to compensate for the slight motion of the personal electronics device 100, the captured frames 104 are actually somewhat larger than the video eventually displayed. The captured frames 104 include a small extra border of pixels so that if, for example, the image has shifted to the left and the leftmost pixels have thus disappeared off the edge of the normal image, these leftmost pixels are still captured in the left border and can be used when the image is moved back to the right to compensate for the motion. This is all well known in the art.)

The motion detector module 110 directly detects physical motion of the personal electronics device 100. Various known hardware implementations are possible here. A three-axis accelerometer can report movement, as can a gyroscope, or a GPS receiver. In some embodiments, the motion detector module 110 is based on an image sensor (that is, an image sensor other than the video camera 102, e.g., a second camera), and it indirectly calculates motion based on perceived motion.

Generally speaking, the personal electronics device 100 includes other components such as a screen for viewing captured images and video, an interface for receiving user commands and for displaying status information, memory for storing controller software and captured frames, and a communications module for sending and receiving information. Because these components are well known in the art and are not of particular concern for the present discussion, they need not be discussed further.

Figure 2:
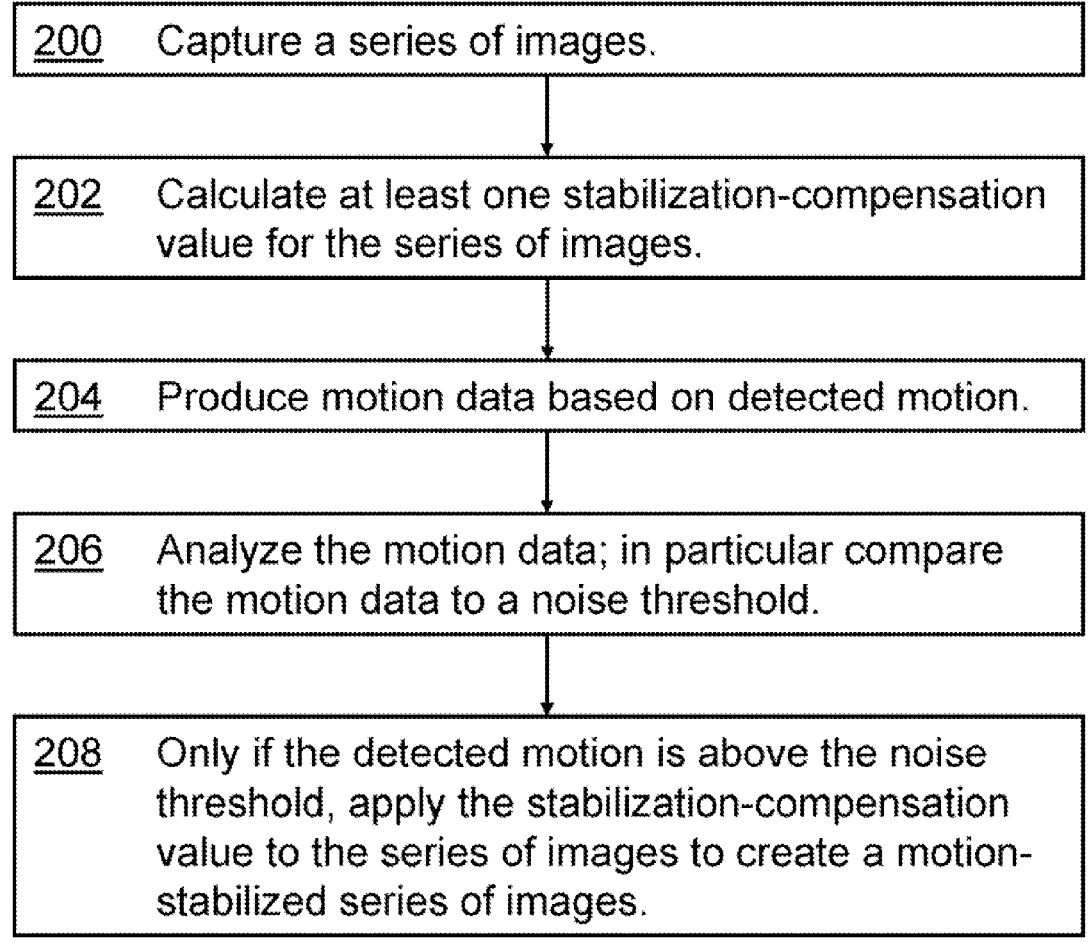
FIG. 2 is a flowchart of a representative method for disabling video stabilization when a camera is steady.

FIG. 2 shows a first representative method usable by the personal electronics device 100 of FIG. 1. In step 200, the video-capture engine (or camera) 102 captures and stores a succession of image frames 104.

Figure 4:
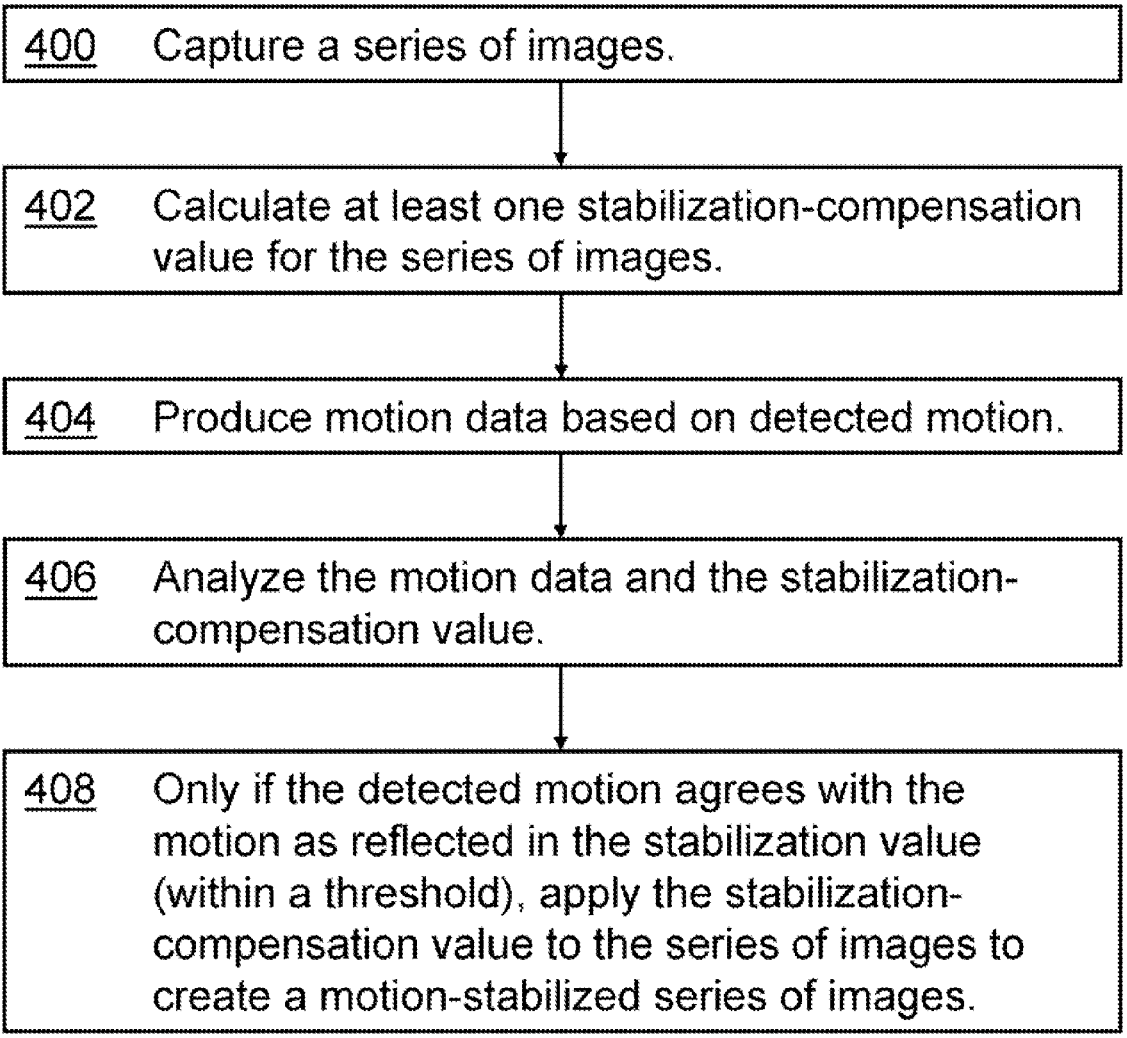
FIGS. 4 and 5 are flowcharts of methods for selectively applying video stabilization when a camera may be moving.
Figure 5:
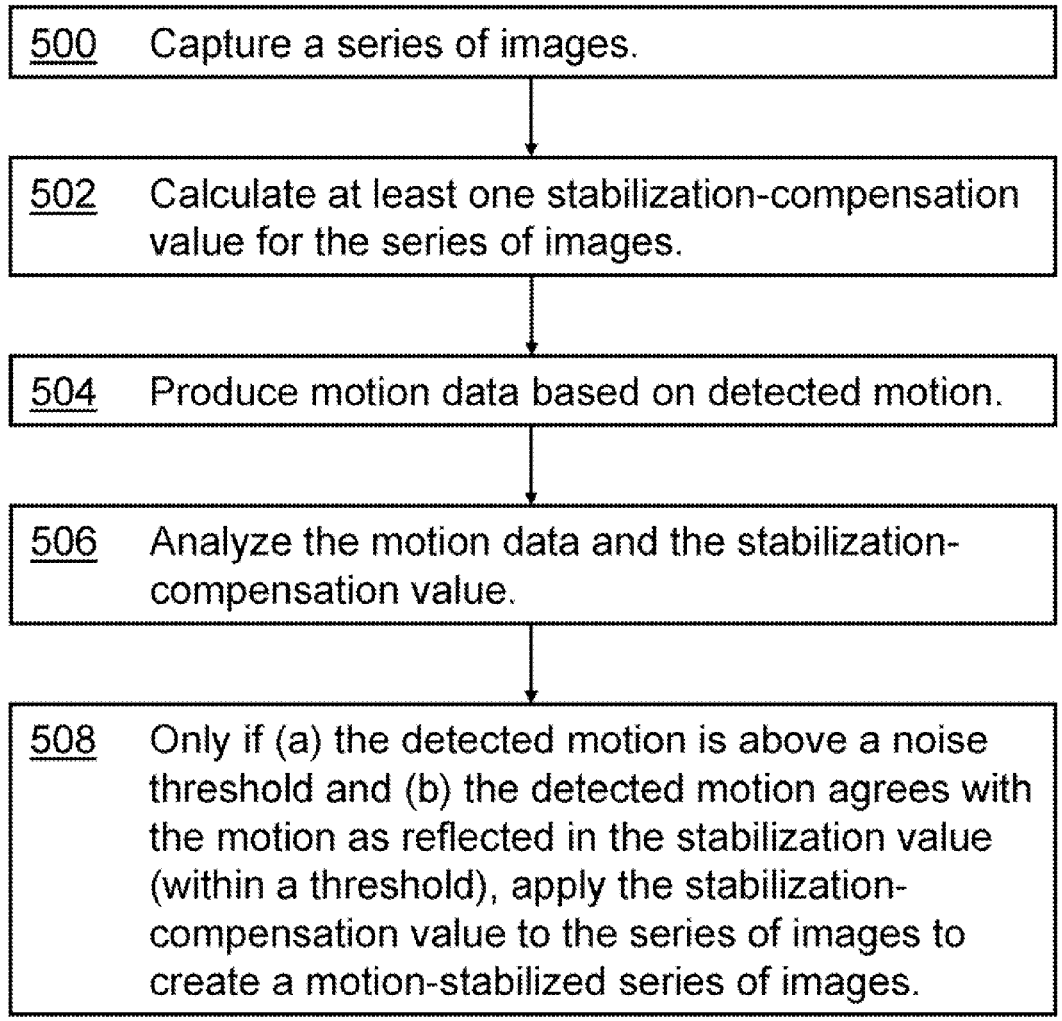

(Note that for ease of discussion, the representative methods of FIGS. 2, 4, and 5 are illustrated and discussed sequentially. In many embodiments, various steps are performed concurrently, possibly by different processors and controllers working, at least to some extent, independently.)

In step 202, well known techniques of video-stabilization analysis are applied to the succession of captured frames 104. In one embodiment, successive frames are compared pixel-by-pixel by the video-stabilization engine 108. If the analysis decides that the differences between frames are best explained, at least in part, by motion of the personal electronics device 100, then one or more stabilization-compensation values are calculated. In some well known embodiments of video stabilization, a calculated stabilization-compensation value minimizes a sum of "pixel-error" differences if it were applied to the second of two successive captured frames 104. For side-to-side motion, for example, a stabilization-compensation value could be a vector whose scalar value is the number of pixels that the detected motion represents and therefore the number of pixels to shift the second image to match (at least approximately) the first image to compensate for motion of the device 100. In a general case, the analysis can detect motion in all three spatial dimensions as well as rotations. (Note that in step 202, the stabilization-compensation values are calculated but are not applied to the captured frames 104.)

In many embodiments, the motion detector 110 constantly produces motion data that represent the detected motions of the personal electronics device 100. In other embodiments, motion data are only produced if motion is detected (i.e., no updated motion data mean no detected motion).

In any case, the current motion data from step 204 are analyzed in step 206. Specifically, the currently detected motion data are compared against a noise threshold value. Most motion detectors 110 known in the art produce some statistically random motion data even when the personal electronics device 100 is completely at rest. Laboratory tests can be run for a particular motion detector 110 by locking it in place and then reading its motion-data output. Viewing the output generally clearly reveals the noise threshold of the motion detector 110. (Of course, statistical techniques more sophisticated than eyeballing a graph can be used to characterize the noise threshold.)

Figure 3A:
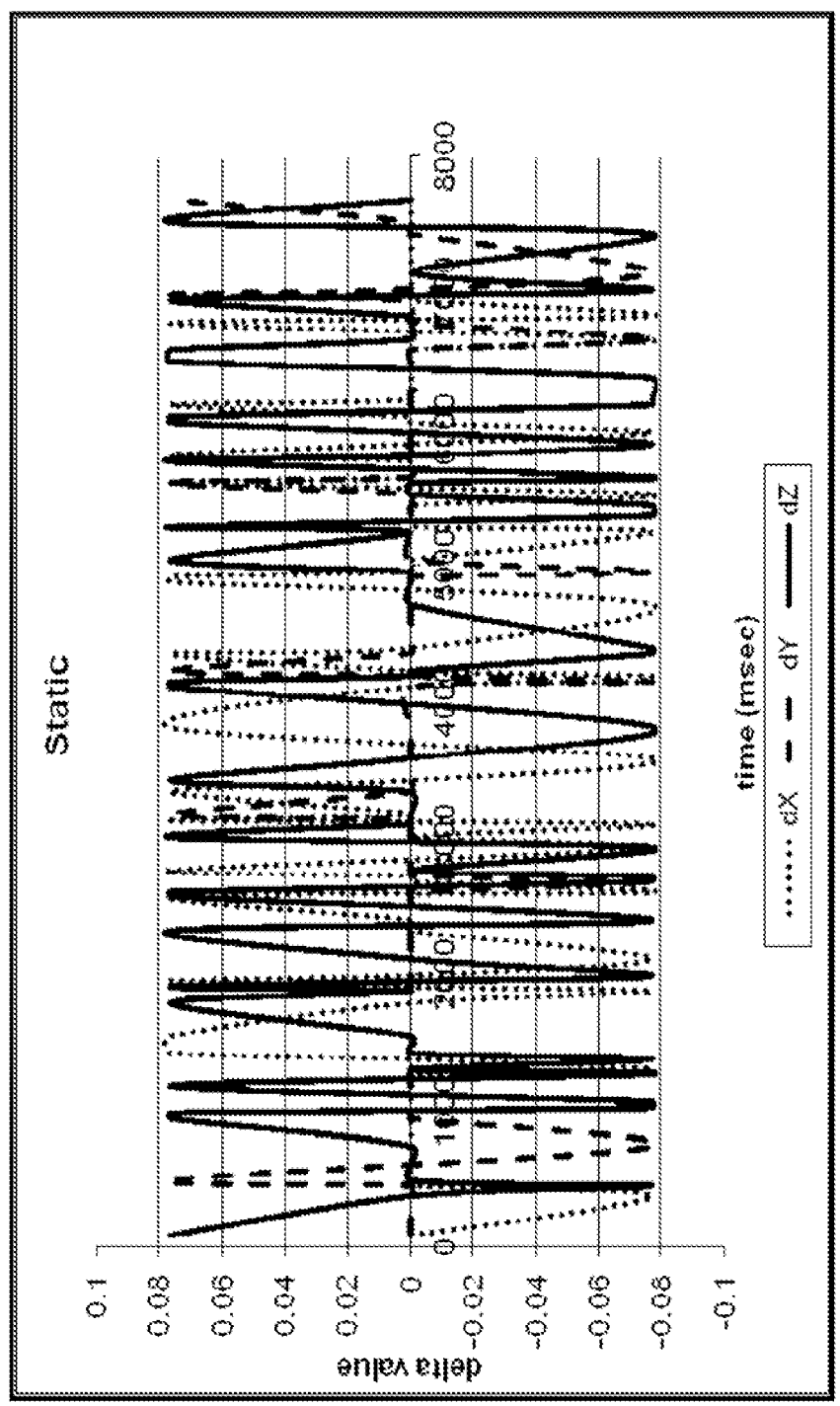
FIGS. 3*a* through 3*c* are graphs of motion-data measurements made for a camera in different circumstances.

FIG. 3a shows the results of an actual test of a motion detector 110 that was held completely static. The graph of FIG. 3a shows the motion data (in three dimensions) produced in this static test case. The graph shows very frequent motion events, all of small amplitude. This is characteristic of detector noise. For this particular motion detector 110, a review of the graph reveals a noise threshold of plus or minus 0.08. (The actual value of the noise threshold for a particular motion detector 110 is of less importance than the presence of a well defined threshold. Of course, lower threshold values are generally better, but achieving a very low threshold may involve production costs that far outweigh any added benefits.)

If the motion data produced in step 204 are below the experimentally derived noise threshold of the motion detector 110, then the personal electronics device 100 is most likely at rest. This is the case even if the video-stabilization engine 108 produces a non-zero stabilization-compensation value in step 202. That non-zero value is most likely to be simply incorrect. Therefore, the method of FIG. 2 concludes in step 208 by only applying the stabilization-compensation value of step 202 to the captured frames 104 if the motion data produced in step 204 are above the noise threshold of the motion detector 110. Otherwise, the device 100 is static, and the stabilization-compensation value is simply ignored.

(The question can be asked: Why would a properly functioning video-stabilization engine 108 produce a non-zero stabilization-compensation value when the personal electronics device 100 is completely static? The answer is based on the realization that the video-stabilization engine 108 does not measure motion directly but only infers motion by comparing successive captured frames 104. That analysis is "fooled" when, to give just one example, more than half of the captured image is actually moving smoothly and steadily across the frame (e.g., when a large object near the front of the scene is moving from right to left). In this case, most embodiments of the video-stabilization engine 108 believe that it is the device 100 that is moving rather than the majority of image being captured. Thus, it produces a non-zero stabilization compensation value when it should, in an ideal world, produce a zero value. If that non-zero value were applied to the captured frames 104 to compensate for the non-existent motion of the static device 100 (that is, if the method of FIG. 2 were not applied), then the resulting output video 112 would include annoying "motion artifacts." The method of FIG. 2 prevents these artifacts.)

Note: Performing step 202 consumes power and resources within the personal electronics device 100 even when the stabilization-compensation values are eventually discarded in step 208 because the device 100 is static. Thus, in some embodiments, step 202 is only performed if the analysis of step 206 reveals that the device 100 may actually be moving. In other embodiments, step 202 is always performed, but the results of that step are only used when they are appropriate.

Figure 3B:
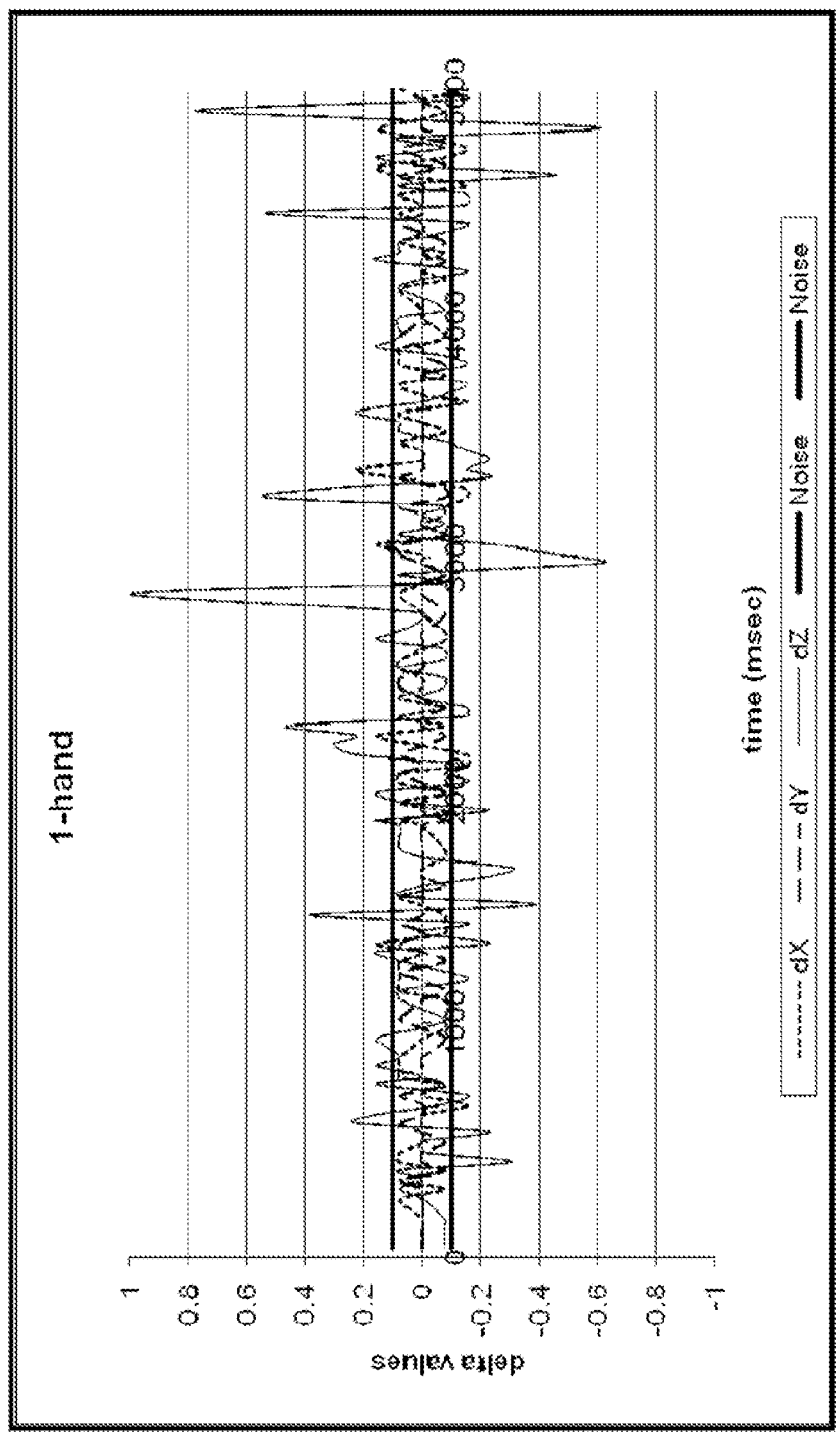

Compare FIG. 3a with FIG. 3b. (The bold horizontal bars at about plus and minus 0.1 of FIG. 3b correspond to the noise threshold measured in FIG. 3a.) The motion data of FIG. 3b were collected while the personal electronics device 100 was held in one hand. FIG. 3b shows very frequent motion events, many of which have amplitudes that far exceed the noise threshold. In this case, video stabilization would be very useful, so step 208 of FIG. 2 allows the stabilization-compensation values to be applied to the captured frames 104 to create the output frames 112. (Techniques for applying stabilization-compensation values to video are well known in the art.)

Figure 3C:
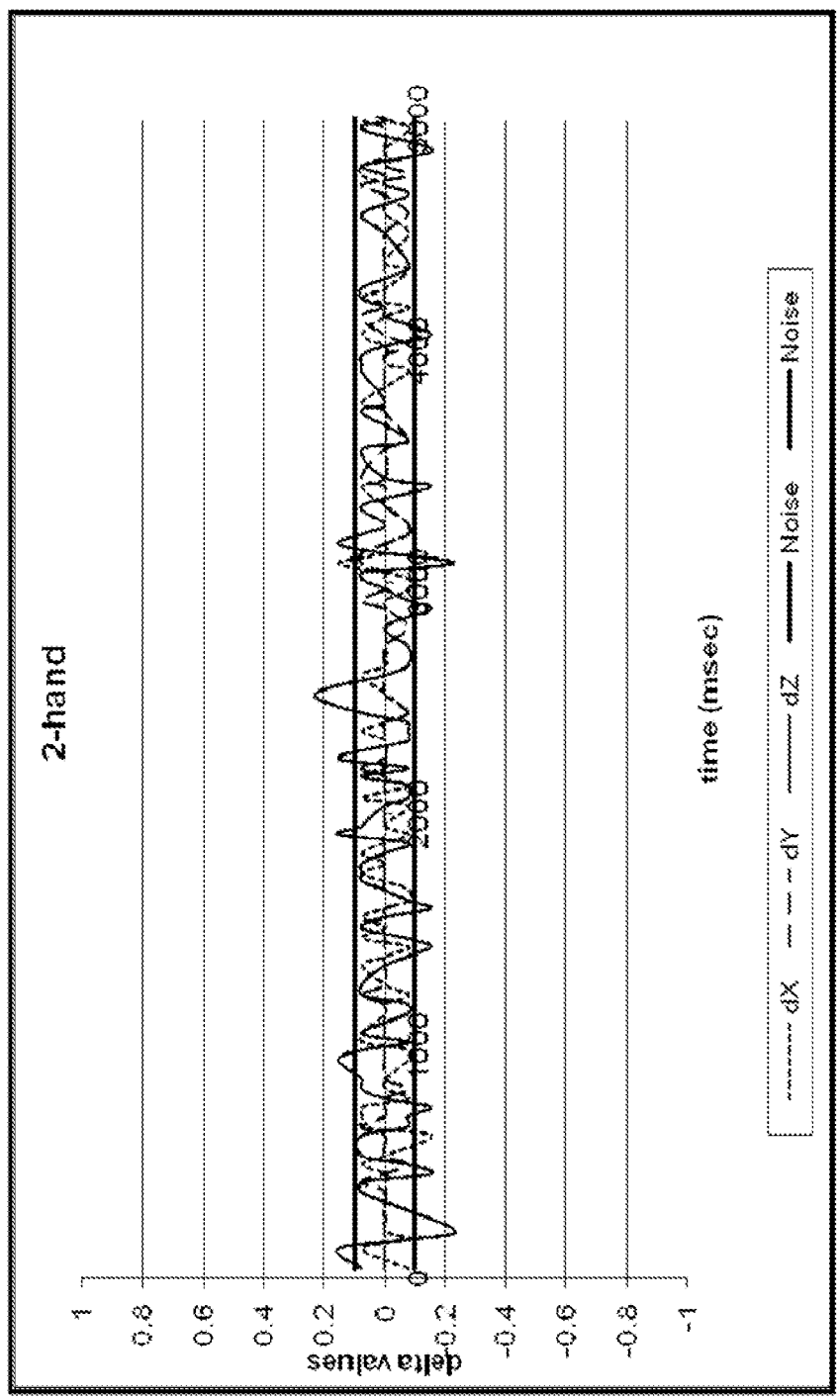

The data for FIG. 3c were taken when the personal electronics device 100 was held in two hands. Comparing the amplitudes and the frequency of the motion events in this figure with those of FIG. 3b, it is clear that a two-hand grip makes for a much more stable device 100. However, the motion amplitudes in FIG. 3c do still sometimes exceed the noise threshold, though usually by less than twice the threshold value. A strict application of the method of FIG. 2 to this situation would allow the stabilization-compensation values to be applied to the captured frames 104. However, this is a borderline case, and more data would be useful to make the best decision about using video stabilization. FIG. 4, discussed below, presents one way to do this.

FIG. 4 shows a second representative method usable by the personal electronics device 100 of FIG. 1. The method of FIG. 4 begins in a fashion similar to the method of FIG. 2. Image frames 104 are captured by the camera 102 (step 400). From the captured frames 104, the video stabilization engine 108 calculates one or more stabilization-compensation values (step 402). Meanwhile, the motion detector 110 produces motion data (step 404).

In step 406, the method of FIG. 4 diverges from that of FIG. 2. Here, the motion data produced by the motion detector 110 are compared against the stabilization-compensation values calculated by the video stabilization engine 108. In high-level terms, this means that two independently derived values for the current motion of the personal electronics device 100 are compared. If the motion detector 110 agrees (within a motion-difference threshold) with the video-stabilization engine 108 as to how, and how much, the device 100 is currently moving, then their agreed upon value is most likely correct. (Note that, as mentioned above, the motion detector 110 may be implemented as a second video camera, such as a front-facing camera on a laptop computer. In this case, step 406 compares the stabilization-compensation values from the two cameras. If the value agree within the motion-difference threshold, then their agreed motion value is most likely to be correct.) In this case, step 408 applies the stabilization-compensation value to the captured frames 104 to create the output frames 112. If the two motion values disagree, then the video-stabilization engine 108 is probably being fooled, so its stabilization-compensation values cannot be relied upon and are discarded.

Laboratory tests of the personal electronics device 100 can be used to set the value of the motion-difference threshold. In some cases, the noise threshold derived for the motion detector 110 when the device 100 is held static (see FIG. 3a and the accompanying discussion) may be used for the motion-difference threshold. It is also conceivable that laboratory testing can find, for some hardware embodiments, an optimal motion-difference threshold that is different from the noise threshold. Different hardware embodiments can lead to different results.

Finally, FIG. 5 shows a third representative method usable by the personal electronics device 100 of FIG. 1. This method combines aspects of the methods of FIGS. 2 and 4. As in those methods, image frames 104 are captured by the camera 102 (step 500). From the captured frames 104, the video stabilization engine 108 calculates one or more stabilization-compensation values (step 502). Meanwhile, the motion detector 110 produces motion data (step 504). As in step 406 of FIG. 4, in step 506 the motion data produced by the motion detector 110 are compared against the stabilization-compensation values calculated by the video stabilization engine 108.

Step 508 applies both the test of step 208 of FIG. 2 and the test of step 408 of FIG. 4. Thus, only if the personal electronics device 100 is not static (that is, if the motion data produced in step 504 are above the noise threshold of the motion detector 110), and if the motion detector 110 agrees (within the motion-difference threshold) with the video-stabilization engine 108 as to how, and how much, the device 100 is currently moving, then the stabilization-compensation values are applied to the captured frames 104 to create the output frames 112. Otherwise, the video-stabilization engine 108 is probably being fooled, so its stabilization-compensation values cannot be relied upon and are discarded.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. On a personal electronics device comprising a camera, a digital video stabilizer, and a motion detector, a method comprising:
   acquiring by the camera, a series of images;
   calculating, based on a comparison of a plurality of images in the series of images by the digital video stabilizer, a stabilization-compensation value;
   producing, by the motion detector during the acquiring, motion data; and
   in the event that an amount of motion of the personal electronics device indicated by the motion data differs from an amount of motion indicated by the stabilization-compensation value by less than a motion-difference threshold, applying the stabilization-compensation value to the series of images.

2. The method of claim 1, wherein the personal electronics device includes at least one of a camera, a mobile telephone, a personal digital assistant, and a tablet computer.

3. The method of claim 1, wherein the motion detector includes at least one of a gyroscope, an accelerometer, a GPS receiver, and an image sensor.

4. The method of claim 1, wherein calculating the stabilization-compensation value includes minimizing a sum of pixel-error differences between compared images of the plurality of images in the series of images.

5. The method of claim 1, wherein the stabilization-compensation value includes at least one of a linear offset and a rotation.

6. The method of claim 1, wherein calculating the motion-difference threshold comprises measuring an amount of noise produced by the motion detector.

7. The method of claim 1, wherein applying the stabilization-compensation value includes modifying an image in the series of images, the modifying based, at least in part, on the stabilization-compensation value, and sending the modified image to a video encoder.

8. A personal electronics device comprising:
a camera configured to acquire a series of images;
a digital video stabilizer configured to calculate, based on a comparison of a plurality of images in the series of images, a stabilization-compensation value;
a motion detector configured to produce motion data while acquiring the series of images; and
a processor operatively connected to the camera, to the digital video stabilizer, and to the motion detector, the processor configured to:
in the event that an amount of motion of the personal electronics device indicated by the motion data differs from an amount of motion indicated by the stabilization-compensation value by less than a motion-difference threshold, apply the stabilization-compensation value to the series of images.

9. The personal electronics device of claim 8, wherein the personal electronics device includes at least one of a camera, a mobile telephone, a personal digital assistant, and a tablet computer.

10. The personal electronics device of claim 8, wherein the motion detector includes at least one of a gyroscope, an accelerometer, a GPS receiver, and an image sensor.

11. The personal electronics device of claim 8, wherein calculating the stabilization-compensation value includes minimizing a sum of pixel-error differences between compared images of the plurality of images in the series of images.

12. The personal electronics device of claim 8, wherein the stabilization-compensation value includes at least one of a linear offset and a rotation.

13. The personal electronics device of claim 8, wherein calculating the motion-difference threshold comprises measuring an amount of noise produced by the motion detector.

14. The personal electronics device of claim 8, wherein applying the stabilization-compensation value includes modifying an image in the series of images, the modifying based, at least in part, on the stabilization-compensation value, and sending the modified image to a video encoder.

15. A personal electronics device comprising: a camera configured to acquire a series of images;
a digital video stabilizer configured to calculate, based on a comparison of a plurality of images in the series of images, a stabilization-compensation value;
a motion detector configured to produce motion data while acquiring the series of images, the producing motion data being separate from the calculating the stabilization-compensation value; and
a processor operatively connected to the camera, the digital video stabilizer and the motion detector, the processor configured to:
determine a difference between an amount of motion indicated by the motion data and an amount of motion indicated by the stabilization-compensation value; and
if the difference is less than a motion-difference threshold, apply the stabilization-compensation value to the series of images.

16. The personal electronics device of claim 15, wherein the personal electronics device includes at least one of a camera, a mobile telephone, a personal digital assistant, and a tablet computer.

17. The personal electronics device of claim 15, wherein the motion detector includes at least one of a gyroscope, an accelerometer, a GPS receiver, and an image sensor.

* * * * *

UNITED STATES PATENT AND TRADEMARK OFFICE
CERTIFICATE OF CORRECTION

| | | |
|---|---|---|
| PATENT NO. | : 9,554,042 B2 | Page 1 of 1 |
| APPLICATION NO. | : 13/625381 | |
| DATED | : January 24, 2017 | |
| INVENTOR(S) | : Petrescu et al. | |

It is certified that error appears in the above-identified patent and that said Letters Patent is hereby corrected as shown below:

On the Title Page

On Page 2, Column 2, under "OTHER PUBLICATIONS", Line 43, insert -- PATENT COOPERATION TREATY, International Search Report and Written Opinion of the International Searching Authority for International Application No. PCT/US2013/057907 (CS39994), 5 December 2013, 11 pages. --.

In the Claims

In Column 8, Line 9, Claim 15, delete "a camera" and insert the same at Line 10, before "configured to acquire a series of images;".

Signed and Sealed this
Second Day of May, 2017

Michelle K. Lee
*Director of the United States Patent and Trademark Office*